United States Patent
Fukunaga et al.

(10) Patent No.: US 6,521,061 B1
(45) Date of Patent: Feb. 18, 2003

(54) PREFORMS, METAL MATRIX COMPOSITE MATERIALS USING SAID PREFORMS, AND PRODUCING PROCESSES THEREOF

(75) Inventors: Hideharu Fukunaga, Hiroshima (JP); Gen Sasaki, Higashi-Hiroshima (JP); Makoto Yoshida, Higashi-Hiroshima (JP); Jin Pan, Hiroshima (JP)

(73) Assignee: Hiroshima University (JP)

(*) Notice: Subject to any disclaimer, the term of this patent is extended or adjusted under 35 U.S.C. 154(b) by 0 days.

(21) Appl. No.: 09/699,566

(22) Filed: Oct. 31, 2000

(30) Foreign Application Priority Data

Apr. 28, 2000 (JP) ........................................ 2000-129822

(51) Int. Cl.$^7$ .......................... C22C 47/09; C22C 47/12
(52) U.S. Cl. ...................... 148/549; 148/400; 148/437; 148/440; 164/97; 428/614
(58) Field of Search ................................ 148/400, 437, 148/440, 549; 428/614, 650, 654; 164/97

(56) References Cited

U.S. PATENT DOCUMENTS

| | | | | |
|---|---|---|---|---|
| 3,892,580 A | * | 7/1975 | Messing | 106/41 |
| 4,367,166 A | * | 1/1983 | Fujitani et al. | 423/652 |
| 4,678,758 A | * | 7/1987 | Kampfer et al. | 501/80 |
| 4,818,633 A | * | 4/1989 | Dinwoodie et al. | 428/614 |
| 5,244,748 A | * | 9/1993 | Weeks et al. | 428/614 |
| 5,447,967 A | * | 9/1995 | Tyszblat | 523/116 |
| 5,543,130 A | * | 8/1996 | Tsuno et al. | 428/654 |
| 5,705,229 A | * | 1/1998 | Abiven et al. | 428/614 |
| 5,998,322 A | * | 12/1999 | Hoshino et al. | 501/118 |

FOREIGN PATENT DOCUMENTS

| | | | |
|---|---|---|---|
| JP | 3-274234 | * | 12/1991 |
| JP | 05-132728 | * | 5/1993 |
| JP | 10-158763 | * | 6/1998 |

* cited by examiner

Primary Examiner—George Wyszomierski
(74) Attorney, Agent, or Firm—Burns, Doane, Swecker & Mathis, L.L.P.

(57) ABSTRACT

A porous preform includes at least one kind of preform-forming materials of ceramic particles, ceramic fibers and ceramic whiskers, and a film of a binder formed on a surface of said at least one kind of the preform-forming materials and comprising magnesium or a magnesium alloy. The preform is used for producing a metal matrix composite material.

26 Claims, 8 Drawing Sheets

TEM photographs of whiskers extracted from $Al_{18}B_4O_{33}/AC4CH$ composite materials

(a) no treatment  (b) SiO₂ binder (c) Mg coat  (d) MgAl₂O₄ coat

*SEM photographs of whiskers in preforms*

SEM photographs of whiskers extracted from whiskers/AC4CH composite material treated

FIG. 5

(a) no treatment  T6

500nm (b) Mg coat  T6

500nm (c) MgAl₂O₄ coat  as-cast

200nm (d) MgAl₂O₄ coat  T6

500nm

TEM photographs of whiskers extracted from
$Al_{18}B_4O_{33}$/AC4CH composite materials

FIG. 6

(a) MgAl₂O₄ coat    as-cast (b) MgAl₂O₄ coat    T6

TEM photographs of whiskers extracted from
$Al_{18}B_4O_{33}$/AC4CH composite materials

PREFORMS, METAL MATRIX COMPOSITE MATERIALS USING SAID PREFORMS, AND PRODUCING PROCESSES THEREOF

BACKGROUND OF THE INVENTION

(1) Field of the Invention

The present invention relates to preforms as a reinforcement for metal matrix composite (abbreviated as "MMC") materials, a producing process thereof, metal matrix composite materials using said preforms and a producing process thereof.

(2) Related Art Statement

The metallic materials have limitations on improvements in their characteristics, and it is difficult to afford all of two or three contradictory characteristics for a single metallic material. In order to improve the characteristics of metallic materials, fiber-reinforced metal matrix composite materials are proposed, in which fibers are incorporated into the metal. Such a metal matrix composite material has been produced by forming a preform from a so-called reinforcement of such as ceramic particles, ceramic fibers or ceramic whiskers with use of a sol or a fine powder of such as silica or alumina, and then impregnating this preform with a matrix such as aluminum alloys or magnesium alloys.

However, the ceramic particles, ceramic fibers or ceramic whiskers constituting the preform may chemically react with an element or elements in the matrix for the matrix. In this case, the conventional binder dose not has a function to prevent the reaction between the ceramics and the element(s) in the matrix.

As a result, the chemical reaction between the specific element(s) in the matrix and the reinforcement such as ceramic short fibers, particles or whiskers causes the shape of reinforcing material itself, which deteriorates the reinforcement power as the composite material.

Further, the chemical reaction between the specific element(s) such as magnesium, in the matrix and the whiskers changes the concentration of the element(s) in the matrix. This causes the deterioration of the aging hardening ability of the matrix. Therefore, it is important to prevent the chemical reaction between the element(s) and the ceramic short fibers in producing the metal matrix composite material. However, such a preventing method or such a metal matrix composite material having its reinforcement highly maintained has not been known to date.

SUMMARY OF THE INVENTION

It is an object of the present invention to provide a preform of ceramic particles, short fibers and/or whiskers, as a reinforcement, which can prevent a reaction between a mother metal as a matrix.

Further, it is another object of the present invention is to provide a metal matrix composite material of which characteristics such as strength are improved by preventing a reaction between a matrix and a preform of ceramic particles, short fibers and/or whiskers.

Furthermore, it is a further object of the present invention is to provide methods for producing the above preform and the metal matrix composite materials, respectively.

In order to solve the above objects, the present inventors came to discover the preform, the metal matrix composite material, and their producing methods through trials to produce thin, condense spinel phase at interfaces between a binder and oxide type short fibers, particles or whiskers by chemically reacting the binder and the reinforcement. The reinforcement is ceramic, and comprises short fibers, particles or whiskers. The short fibers and whiskers usually have lengths of 10~1000 µm, and diameters of 1~100 µm. The particles have usually diameters of 1~100 µm.

The porous preform comprises at least one kind of preform-forming materials selected from ceramic particles, ceramic fibers or ceramic whiskers, and a binder applied on a surface of said at least one kind of the preform-forming materials, said binder comprising magnesium or a magnesium. The binder may be applied in a form of a film on that surface of at least one kind of the preform-forming materials.

As a preferred embodiment of the porous preform according to the present invention, the ceramic particles, the ceramic fibers and the ceramic whiskers comprise an oxide capable of forming a film through a reaction with the binder material(s).

As another preferred embodiment of the porous preform according to the present invention, said magnesium or magnesium alloy reacts with preform-forming materials of ceramic fibers, the ceramic particles and/or the ceramic whiskers, and then forms a film of spinel structure at the interface between the reinforcement and matrix.

As a further preferred embodiment of the porous preform according to the present invention, the ceramic particles, ceramic fibers and ceramic whiskers comprise aluminum borate.

The method for producing a porous preform according to the present invention, comprises the steps of preparing a porous mass of at least one kind of porous preform-forming materials of ceramic particles, ceramic fibers and ceramic whiskers, applying magnesium or a magnesium alloy as a binder on a surface of said at least one kind of the preform-forming materials, and heat-treating the resulting porous preform, thereby forming a thin and uniform spinel phase on said surface. The thus formed spinel phase comprises a spinel structure-possessing compound. The Mg or Mg alloy may be applied by vapor deposition.

As a preferred embodiment of the porous preform-preform producing method according to the present invention, the ceramic particles, ceramic fibers and ceramic whiskers are comprised of oxide materials, which can react with binder material(s) and form the film as a product.

As another preferred embodiment of the porous preform-preform producing method according to the present invention, the ceramic particles, ceramic fibers and ceramic whiskers comprise aluminum borate.

As another preferred embodiment of the porous preform-preform producing method according to the present invention, the vapor deposition of magnesium to the reinforcement is effected under vacuum.

The metal matrix composite material comprising the porous preform, and a metal continuous phase made of at least one kind of metal selected from the group consisting of aluminum, an Al—Si alloy, an Al—Cu based alloy, an Al—Mg based alloy, an Al—Si—Cu based alloy, and an Al—Si—Mg based alloy, an Mg-based alloy and an Mg—Zr based alloy, the metal continuous phase replacing the voids in the porous preform.

A preferred embodiment of the metal matrix composite material according to the present invention, comprises a porous preform, and a metal continuous phase made of at least one kind of metals selected from the group consisting of aluminum, an Al—Si based alloy, an Al—Cu based alloy, an Al—Mg based alloy, an Al—Si—Cu based alloy, an Al—Si—Mg based alloy, an Mg-based alloy and an Mg—Zr based alloy, said metal continuous phase replacing the voids in the porous preform, said preform being prepared by the steps of preparing a porous mass of at least one kind of porous preform-producing materials of ceramic particles, ceramic fibers and ceramic whiskers, and vapor depositing magnesium or a magnesium alloy on surfaces of said at least one kind of the porous preform-forming.

As another embodiment of the metal matrix composite material according to the present invention, the coated magnesium or magnesium alloy reacts with the reinforcement and then forms a film of spinel structure as a product of the reaction.

As a further preferred embodiment of the porous preform-preform producing method according to the present invention, the ceramic particles, ceramic fibers and ceramic whiskers comprise aluminum borate.

The method for producing the metal matrix composite material according to the present invention, comprises impregnating the porous preform with a melt of aluminum or an aluminum alloy.

A preferred embodiment of the method for producing the metal matrix composite material according to the present invention, comprises the steps of preparing a porous mass of at least one kind of a porous preform-forming material of ceramic particles, ceramic fibers and ceramic whiskers, vapor depositing magnesium or a magnesium alloy on surfaces of the at least one kind of the porous-preform material, and heat-treating the resulting porous mass, thereby forming a thin and uniform spinel phase on the surfaces, and impregnating the porous preform with a melt of aluminum or an aluminum alloy.

As a preferred embodiment of the metal matrix composite material according to the present invention, the impregnation is effected under pressure or with no pressurization.

As another preferred embodiment of the metal matrix composite material according to the present invention, the impregnation is effected by a squeeze casting method.

These and other objects, features and advantages of the invention will appreciated upon reading of the following description of the invention when taken in conjunction with the attached drawings, with the understanding that some modifications, changes and variations may be easily made by the skilled person in the art.

BRIEF DESCRIPTION OF THE DRAWINGS

For a better understanding of the invention, reference is made to the attached drawings, wherein.

DETAILED DESCRIPTION OF THE INVENTION

In the porous preform according to the present invention, a film of magnesium or a magnesium alloy is formed as a binder on surfaces of ceramic particles, ceramic fibers or ceramic whiskers. Ceramic materials to be used for the porous preform according to the present invention, which are not particularly limited, mean non-metallic inorganic materials obtained by sintering or the like. Preferably, the ceramic materials mean oxides capable of forming films having a spinel structure produced through a reaction between the binder. As the ceramic material, aluminum borate may be specifically recited.

The magnesium alloy is not specifically limited, but AZ-based alloys (Mg—Al—Zn based alloys) and AM-based alloys (Mg—Al—Mn based alloys) may be recited, for example.

The spinel structure means a crystalline structure possessed by compounds expressed by a chemical formula $AB_2X_4$ (A, B: cation elements, X: anion element).

So long as the film comprises magnesium or the magnesium alloy, no limitation is posed upon the film. Preferably, magnesium or the magnesium alloy reacts with the reinforcement, and then form the compound which has spinel structure. In this case, a thin and dense magnesium spinel phase is formed at the interfaces between the short fibers, particles or whiskers and the binder.

The thickness of the spinel phase is not particularly limited, but preferably 1 nm to 500 nm, more preferably 5 to 100 nm.

The reason why the thickness of the spinel is preferably set in such a range is that if the thickness is less than 1 nm, an effect of fully preventing a reaction between an element or elements in the mother material and the ceramic short fibers or the like is reduced, whereas if it is more than 500 nm, the characteristics of the ceramic fibers, particles or whiskers may be deteriorated.

In the porous preform-producing method according to the present invention, the binder is first vapor deposited onto the surfaces of the ceramic particles, fibers or whiskers to form the porous preform.

The vapor deposition may be effected by appropriately using an ordinary vapor deposition method. In this case, no limitation is posed upon the vapor depositing method. For example, a vacuum vapor deposition method may be used. In the vacuum deposition method, no particular limitation is posed upon the pressure of the vacuum and the vapor pressure of the binder. Further, after evacuation to vacuum, an inert atmosphere such as argon may be filled. Thus, the porous body is formed.

As mentioned later, the porous body, or the porous preform, which is obtained by forming a films having the spinel structure upon the surfaces of the ceramic fibers or the like on the porous body through heat treating the porous body, may be used in producing the metal matrix composite material according to the present invention. The heat treatment can be effected in a temperature range of 500 to 1,200° C., preferably 600 to 900° C. The holding time in the heat treatment is not particularly limited, but preferably 0.5 to 3 hours. The heat treatment can cause the chemical reaction between the short fibers or the like with magnesium or the magnesium alloy to form the spinel phase on the surfaces of the short fibers. The spinel structure-possessing phase can prevent the reaction between the element in the mother metal (matrix) and the ceramic short fibers, particles or whiskers to interrupt the shape deformation of the ceramic short fibers or the like. The heat treatment can be effected in an inert atmosphere or under vacuum.

The metal matrix composite material according to the present invention is characterized in that at least one kind of metallic materials selected from the group consisting of aluminum, Al—Si based alloys, Al—Cu based alloys, Al—Mg based alloys, Al—Si—Cu based alloys, Al—Si—Mg based alloys, Mg-based alloys and Mg—Zr alloys replace as a continuous phase voids of the porous preform as mentioned above.

As the aluminum alloy to be used in the metal matrix composite material according to the present invention, alloys containing manganese, silicon, magnesium, copper, zinc or the like may be recited to improve the material properties of aluminum.

The metal matrix composite material according to the present invention can be obtained by impregnating the above porous body or the porous preform with aluminum or the aluminum alloy. When the metal matrix composite material is produced by using the above porous body, the spinel structure-possessing film can be formed with heat of the molten metal during the impregnation or through the succeeding heat treatment (solid solution treatment, aging treatment or the like).

The impregnation may be effected under pressure or without pressurization. As the impregnation under pressure, the squeeze casting method (high pressure casting method) and the die casting method may be recited, for example. As the impregnation method, the squeeze casting method is preferred, because it has excellent moldability, mass productivity and economy.

The impregnated metal matrix composite material may be subjected to the heat treatment such as solid solution treatment, aging treatment or the like, if necessary. The time required for the solid solution treatment, which may be appropriately varied depending upon the kinds of the matrix, etc. used, is not particularly limited. The time is ordinarily about 5 to 15 hours. The temperature in the solid solution treatment, which may be appropriately varied depending upon the kinds of the matrix, etc. used, is not particularly limited. The temperature is ordinarily about 500 to 1000° C. The aging treatment is not particularly limited. For example, if the matrix is an aluminum alloy, the conditions are about 100 to 200° C. and about 3 to 9 hours. The heat treatment may be appropriately varied depending upon the kinds of the materials, their strengths, etc.

EXAMPLES

Example 1

As a reinforcing material, whiskers of aluminum borate (manufactured by Skikoku Corporation Co., Ltd.) were used. The porous preform was prepared with use of magnesium as a binder as follows.

Solid magnesium and a mass of short fibers made of aluminum borate ($AlBO_4$) were placed in a heating chamber, which was evacuated to vacuum by using a rotary pump or an oil-diffusing pump. At that time, the whole pressure inside the chamber was set at not more than 100 mmHg (100 Torr). The interior of the chamber was heated, and held at an arbitrary temperature between 500° C.~1200° C. Thereby, the interior of the chamber was filled with a saturated vapor of magnesium in equilibrium with magnesium in a solid or liquid state. The magnesium saturated vapor was diffused into the interior space of the mass of the short fibers, so that a part of the magnesium was attached onto the surfaces of the fibers. As the temperature of the chamber was lowered, the magnesium vapor became oversaturated inside the chamber, so that magnesium was attached onto and covered the surfaces of the short fibers, thereby obtaining a porous body.

The porous body was heated at 500° C. to 900° C. in air, and thereby uniform and thin films of a magnesium spinel oxide were formed 10 nm in thickness on the surfaces of the short fibers, thereby obtaining the porous preform. Thereafter, this porous preform was impregnated with a melt of an aluminum alloy JIS AC4CH according to the squeeze casting method, thereby producing a metal matrix composite material.

As a comparative example, a porous preform using a $SiO_2$ binder, a porous preform using no binder and a preform using no binder were prepared, which were impregnated with the molten aluminum alloy according to the squeeze casting method, thereby producing metal matrix composite materials, respectively.

The producing conditions were that a preheating temperature of the porous preform was 700° C., the temperature of the melt was 760° C., the temperature of a mold was 200° C., and the applied pressure was 100 MPa. The resulting preform was subjected to the solid solution treatment at 525° C. for 8 hours, then quenching by water, and to the aging treatment at 160° C. for 6 hours.

Evaluation of the Preforms

Figure 1:
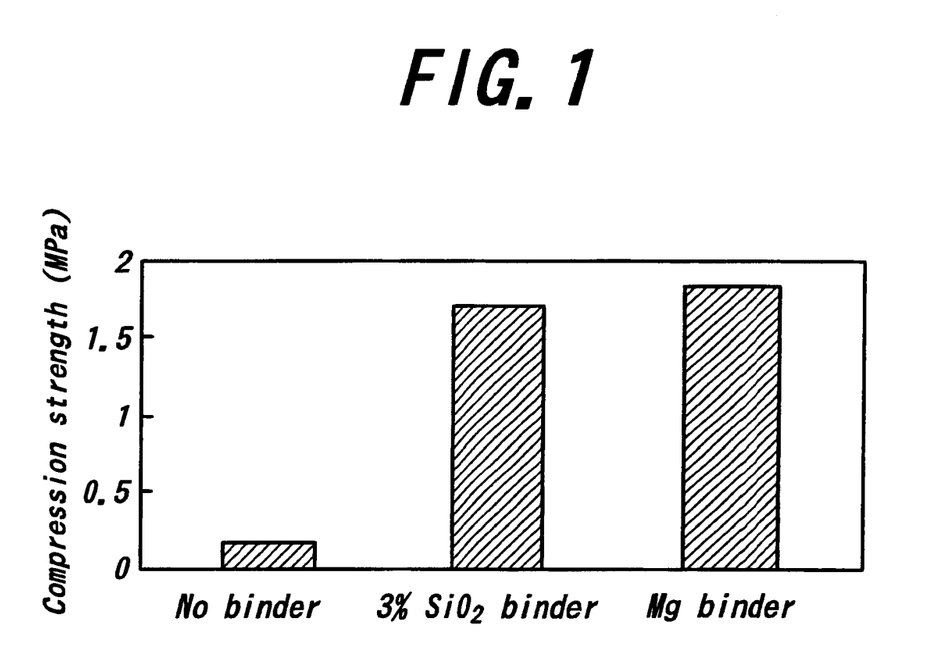
FIG. 1 is a graph showing results of compression tests upon preforms.

In order to evaluate the strength of each of the preforms, a piece was cut in a size of 20 mm×20 mm×35 mm from the preform, and subjected to a compression test at a crosshead speed of 0.1 mm/min. Test results of the preforms in the compression tests are shown in FIG. 1. From this, it is seen that the preforms added with the binders have strengths around ten times as much as that with no binder.

Figure 2:
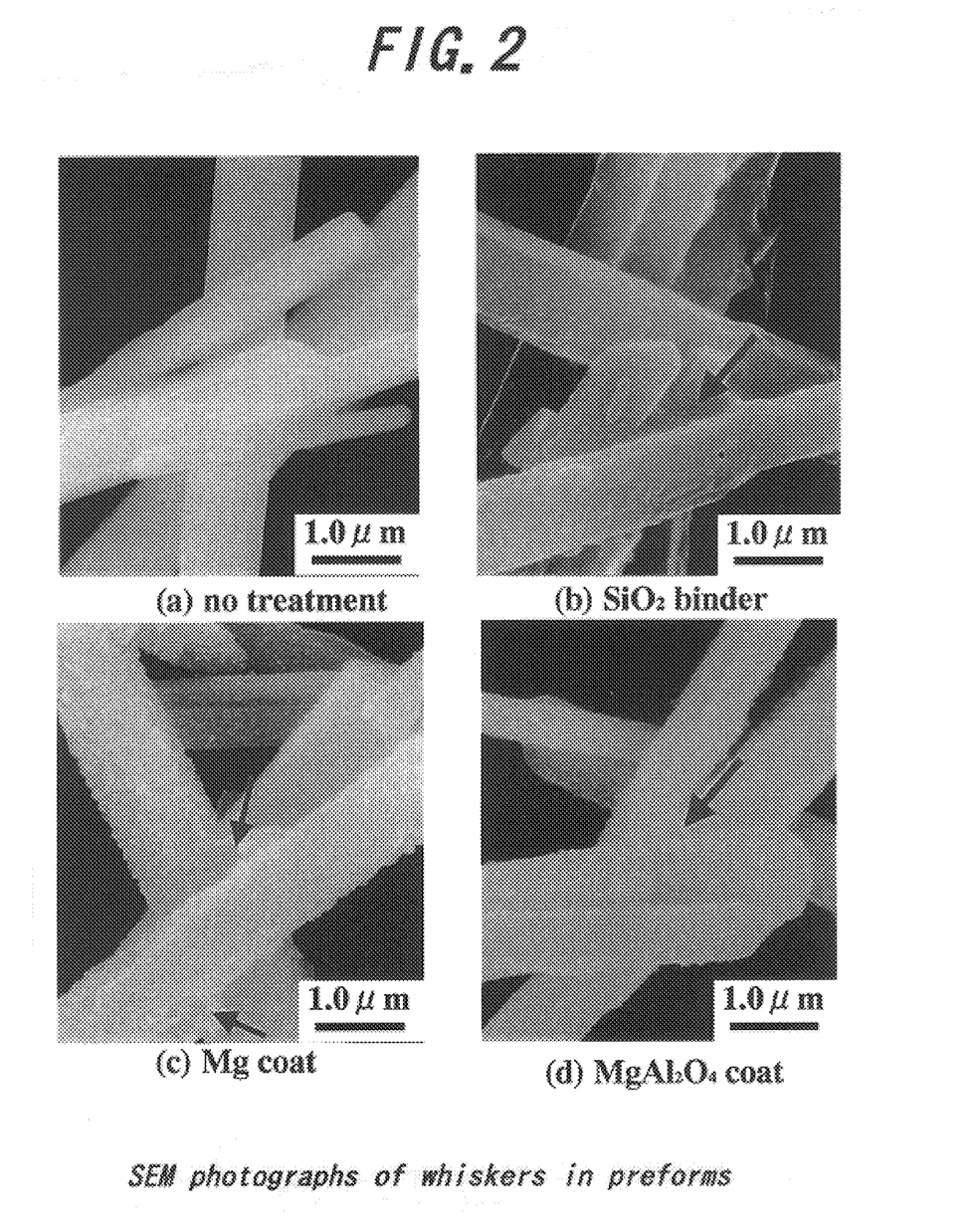
FIGS. 2(a) to 2(d) give scanning electron microscope photographs showing interiors of the preforms.

FIGS. 2(a) to 2(c) show the attached states of the binders in the preforms. From them, it is seen in the cases of the $SiO_2$ binder and the Mg binder that the whiskers are crosslinked at their joints portions. It is considered that this crosslinking increased the compression strength of the preforms.

Evaluation of Metal Matrix Composite Materials

Results on tensile tests for the metal matrix composite materials are shown in Table 1. The tensile strength was effected at a crosshead speed of 0.5 mm/min. with respect to a given test piece obtained from the preform.

TABLE 1

| | | UTS (MPa) | |
|---|---|---|---|
| Binder | $V_f$ (%) | Cast (as cast) | after heat treatment |
| Binder not added | 19.6 | 302.3 | 232.5 |
| 3% $SiO_2$ | 16.8 | 261.1 | 233.8 |
| Mg binder | 19.2 | 312.1 | 307.7 |

Since the volume fraction $V_f$ of the reinforcing material differs depending upon the deformation of the preform, the fraction $V_f$ was reduced to 20% by using the following equation (1).

$$\sigma_c = \alpha \sigma_f V_f + (1-V_f)\sigma_m^* \qquad (1)$$

in which $\sigma_c$=tensile strength, $\alpha$=coefficient of fiber-reinforcing effect, $\sigma_f$=tensile strength of reinforcing material, $V_f$=volume percentage, $\sigma_m{}^*$=strength of mother material at the time of fracture of composite material.

Figure 3:
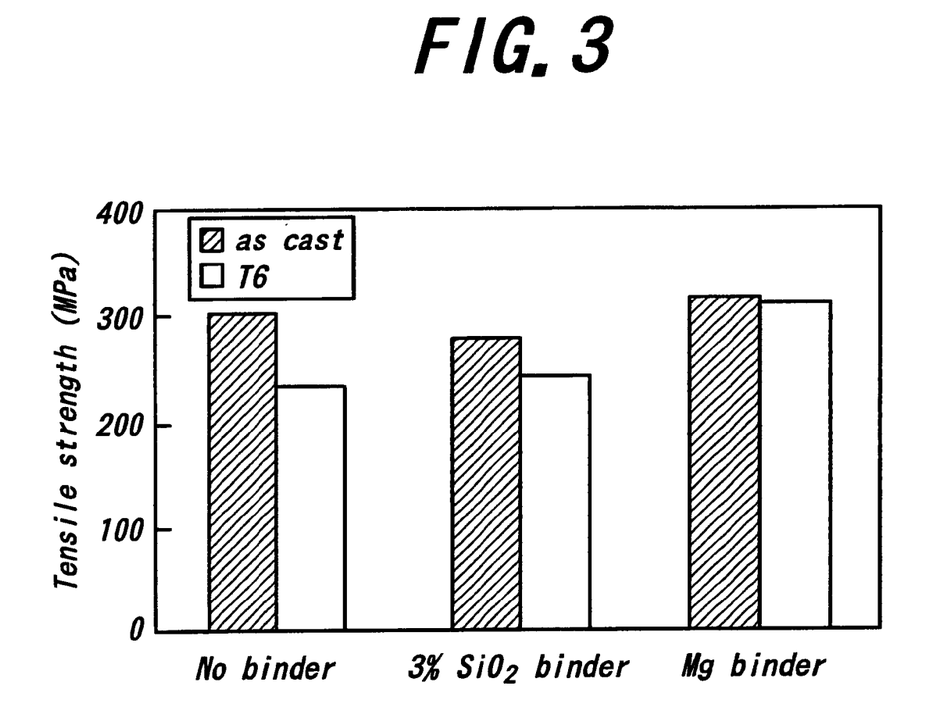
FIG. 3 is a graph showing tensile strengths as calculated at a volume percentages of 20%.

Tensile strengths are shown in FIG. 3, while the volume percentage is reduced to 20%.

From FIG. 3, it is seen that the tensile strength of the metal matrix composite material using the Mg binder was highest, 319 MPa, and exhibits the highest tensile strength of 315 MPa even after the heat treatment. The composite materials using no binder and the 3% $SiO_2$ binder exhibited the tensile strengths of 70 MPa and 35 MPa, respectively, after the heat treatment, and no aging curing with Mg in the alloy. The reason why the strength of the as-cast composite material with the $SiO_2$ binder is low is considered to be that $SiO_2$ reacted with aluminum melt during the casting, which caused segregation of alloy elements such as Mg or precipitation of coarse silicon grains and therefore locally reduce strength.

Figure 4:
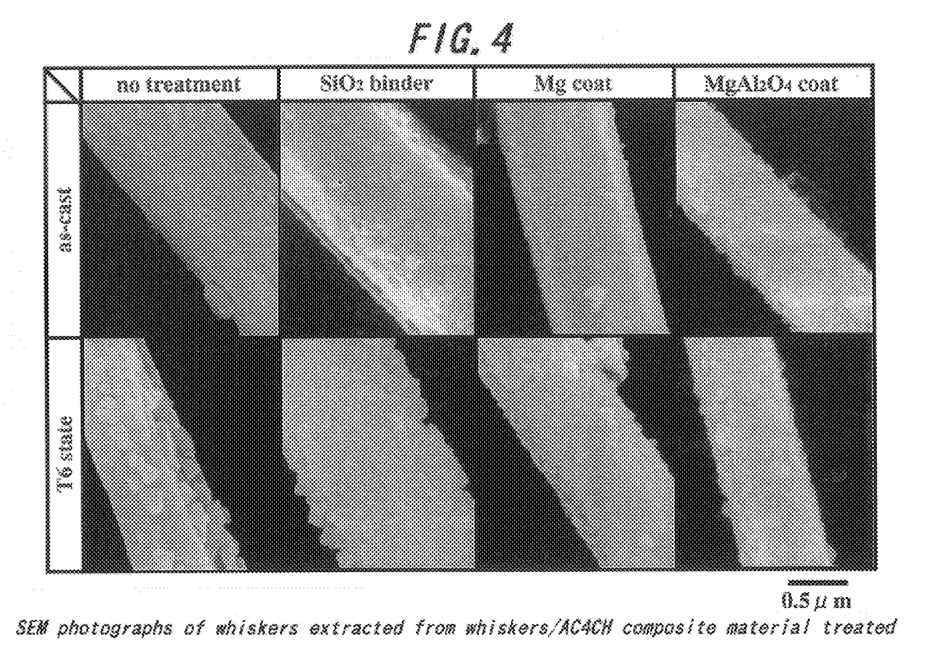
FIG. 4 gives scanning electron microscope photographs of whiskers removed from various metal matrix composite materials.

FIG. 4 shows SEM photographs of whiskers extracted from the composite materials. It is seen that every whisker has a reaction product on the surface thereof. In the SEM photographs of the composite materials having no binder or the $SiO_2$ binder, it is seen that the reaction product grew between before and after the heat treatment. On the other hand, it is seen that the Mg binder caused less change in the surface state of the whiskers between before and after the heat treatment. It is considered that in the case of the composite material using the Mg binder, Mg consumed by the reaction between the whiskers and the matrix is supplemented from Mg in the binder to prevent reduction in the strength.

Example 2

Preforms and a metal matrix composite materials were produced by the same methods as in Example 1 except that the heat treating time was changed when magnesium was used as the binder. The solid solution treatment was effected at 535° C. for 8 hours, followed by aging treatment at 155° C. for 6 hours.

Evaluation of Preforms

Figure 5:
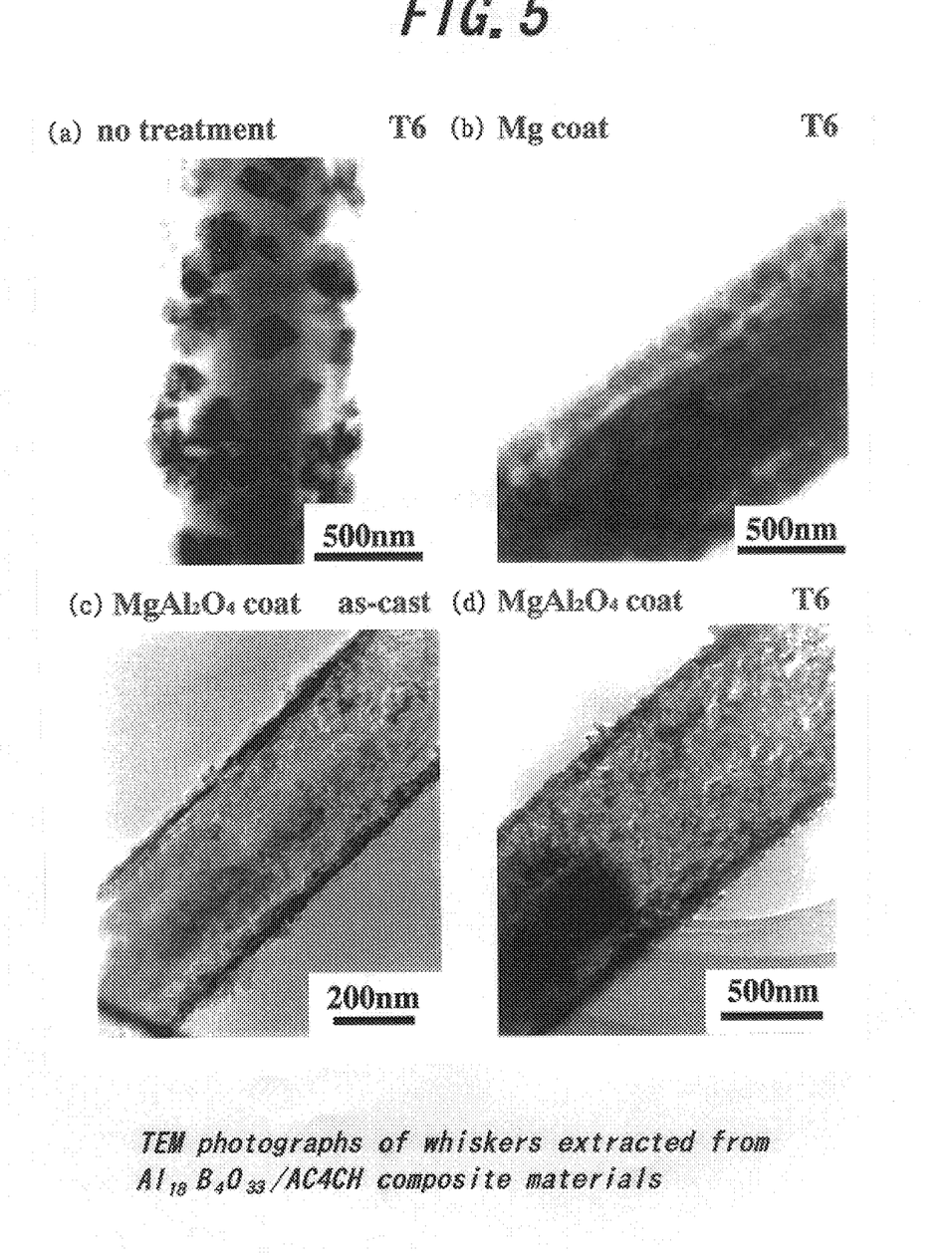
FIGS. 5(a) to 5(d) give transmission electron microscope (TEM) photographs of whiskers removed from $Al_{18}B_4O_{33}$ (aluminum borate)/AC4CH (aluminum alloy) composite material in one example of the present invention.
Figure 6:
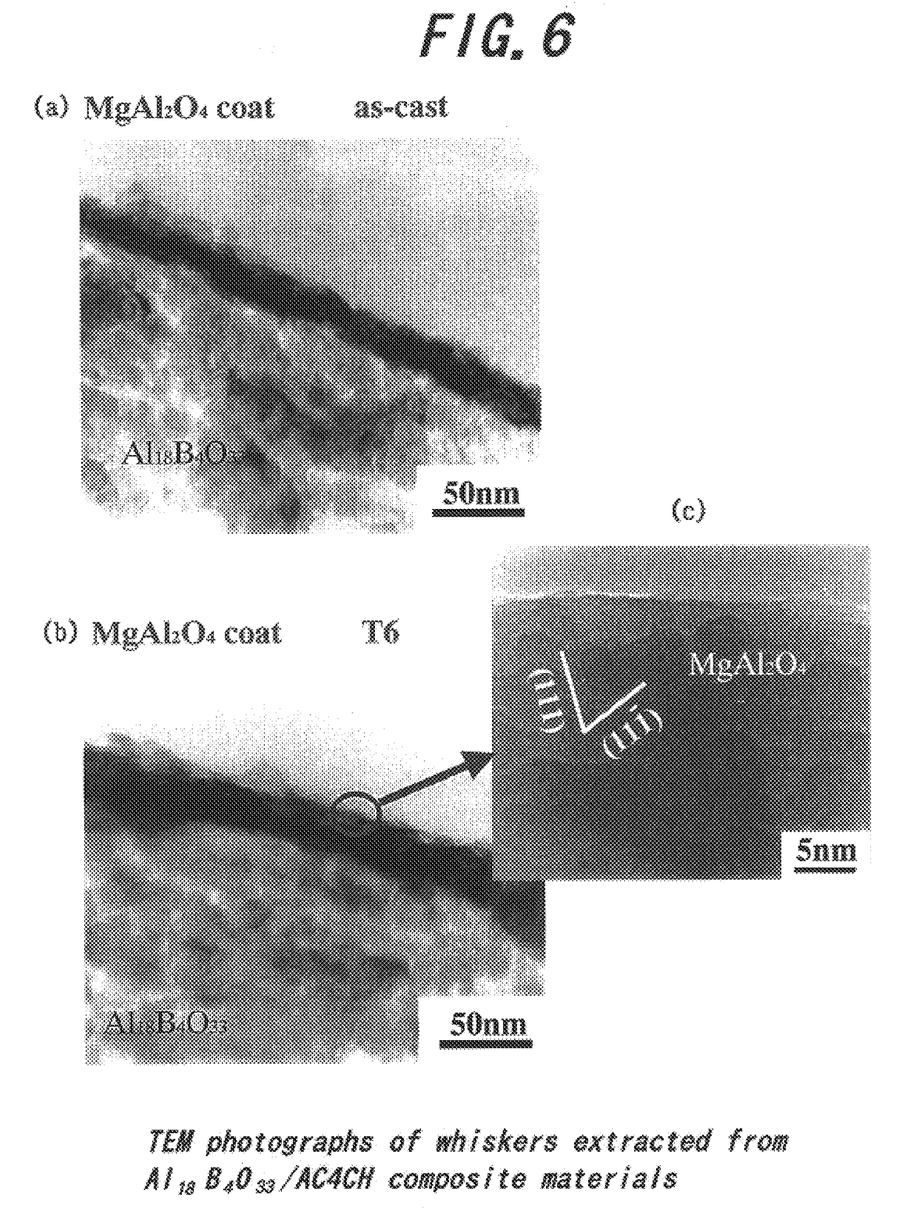
FIGS. 6(a) to 6(c) give TEM photographs of whiskers removed from $Al_{18}B_4O_{33}$/AC4CH composite material in one example of the present invention.

FIG. 2(d) shows the attached state of the binder in the preform. FIG. 2(d) is a scanning electron microscope photograph of the interior of the preform showing that vapor deposited magnesium works as the binder. In order to confirm the formation of the spinel phase, a transmission electron microscope (TEM) photograph was taken. FIG. 5 is a TEM photograph showing whiskers extracted from an $Al_{18}B_4O_{33}$/AC4CH composite material. FIGS. 6(a) to 6(c) are TEM photographs showing the preform coated with $MgAl_2O_4$. FIG. 6(c) is an HRTEM photograph in an enlarged scale at a circled portion in FIG. 6(b).

From the above results, it is seen that the reaction products exist on the surfaces of the whiskers. In the $MgAl_2O_4$-coated composite material in which the spinel phase was grown by fully heat treating the magnesium coated, the thickness of the spinel phase was about 5 nm.

Figure 7:
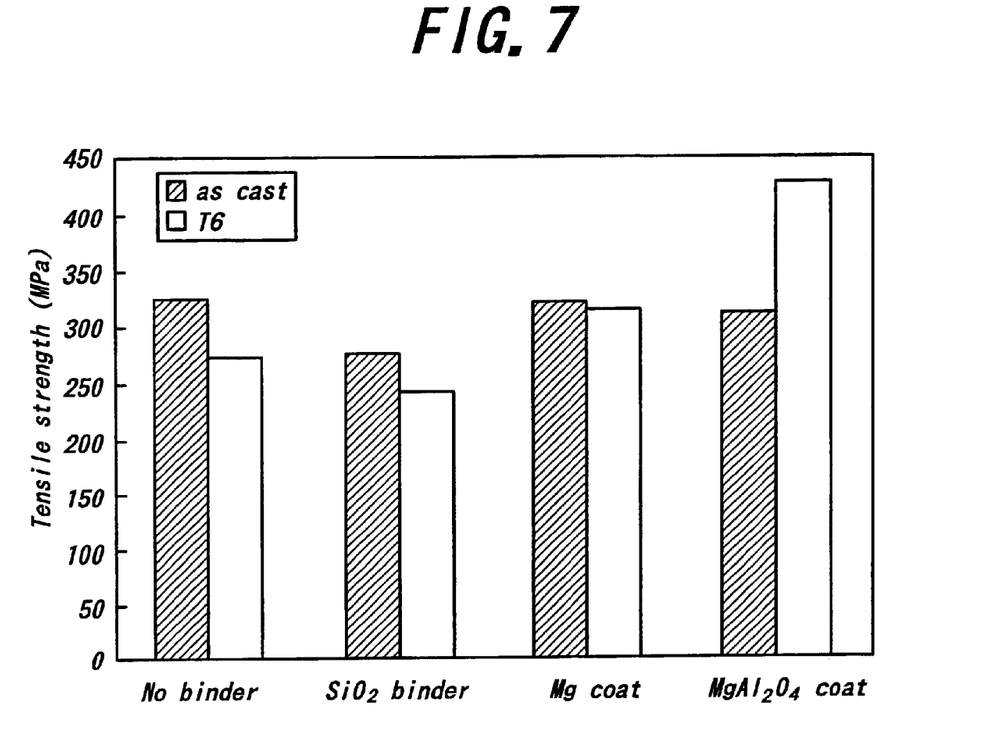
FIG. 7 is a graph showing tensile strengths of metal matrix composite materials.
Figure 8:
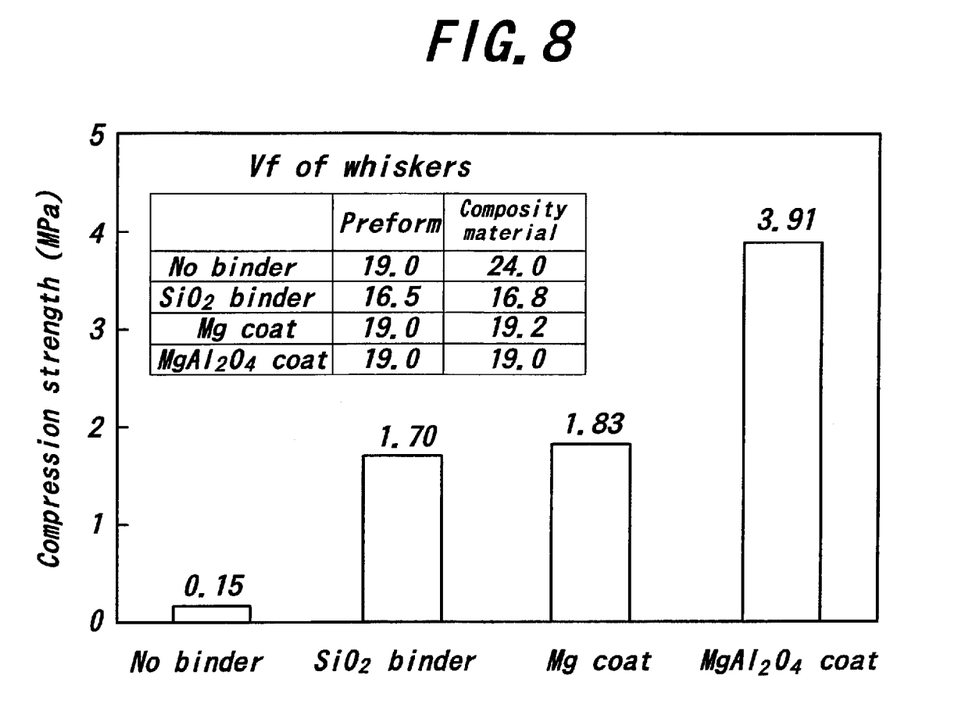
FIG. 8 is a graph also showing tensile strength of various metal matrix composite materials.

Tensile strength and compression strength of each metal matrix composite materials were determined. Measurement results are shown in FIGS. 7 and 8. As a result, the $MgAl_2O_4$-coated metal matrix composite material exhibited the highest strength even after the heat treatment. That is, it was confirmed that the aluminum alloy produced by using the preform coated with magnesium vapor deposited can be strengthened by aging precipitation.

According to the preform of the present invention, advantageous effects that the chemical reaction between the specific element(s) in the aluminum alloy and the ceramic short fibers, particles or whiskers can be effectively prevented without deteriorating the shape of the short fibers, particles or whiskers can be attained.

What is claimed is:

1. A metal matrix composite material comprising:
   a porous preform comprising at least one preform-forming material selected from the group consisting of ceramic particles, ceramic fibers and ceramic whiskers, and a binder applied on a surface of said at least one preform-forming material, said binder comprising magnesium or a magnesium alloy; and
   a metal continuous phase made of at least one metal selected from the group consisting of aluminum, an Al—Si based alloy, an Al—Cu based alloy, an Al—Mg based alloy, an Al—Si—Cu based alloy, an Al—Si—Mg based alloy, an Mg-based alloy and an Mg—Zr based alloy, said metal continuous phase replacing as a continuous phase voids of the porous preform.

2. The metal matrix composite material set forth in claim 1, wherein said magnesium or magnesium alloy forms a film of a spinel phase on the surface of said at least one preform-forming material through a reaction with said at least one preform-forming material, said film comprising a compound having a spinel structure.

3. The metal matrix composite material set forth in claim 2, wherein said ceramic particles, ceramic fibers and ceramic whiskers comprise aluminum borate.

4. A metal matrix composite material comprising a porous preform, and a metal continuous phase made of at least one metal selected from the group consisting of aluminum, an Al—Si based alloy, an Al—Cu based alloy, an Al—Mg based alloy, an Al—Si—Mg based alloy, an Mg-based alloy and an Mg—Zr based alloy, an Al—Si—Cu based alloy, said metal continuous phase replacing voids of the porous preform, said preform being prepared by the steps of preparing a porous mass of at least one preform-forming material selected from the group consisting of ceramic particles, ceramic fibers and ceramic whiskers, vapor depositing magnesium of a magnesium alloy on surfaces of said at least one preform-forming material, and heat-treating the resulting porous preform.

5. The metal matrix composite material set forth in claim 4, wherein said magnesium or magnesium alloy forms a film of a spinel phase on the surface of the said at least one preform-forming material through a reaction with said at least one preform-forming material, said film comprising a compound having a spinel structure.

6. The metal matrix composite material set forth in claim 5, wherein said ceramic particles, ceramic fibers and ceramic whiskers comprise aluminum borate.

7. The metal matrix composite material set forth in claim 4, wherein said ceramic particles, ceramic fibers and ceramic whiskers comprise aluminum borate.

8. A process for producing a metal matrix composite material comprising a porous preform and a metal continuous phase, the process comprising impregnating a porous preform with a melt of aluminum or an aluminum alloy, the porous preform comprising at least one preform-forming material selected from the group consisting of ceramic particles, ceramic fibers and ceramic whiskers, and a binder applied on a surface of said at least one preform-forming material, said binder comprising magnesium or a magnesium alloy, the metal matrix composite material comprising a metal continuous phase made of at least one metal selected from the group consisting of aluminum, an Al—Si based alloy, an Al—Cu based alloy, an Al—Mg based alloy, an Al—Si—Cu based alloy, an Al—Si—Mg based alloy, an Mg-based alloy and an Mg—Zr based alloy, said metal continuous phase replacing as a continuous phase voids of the porous preform.

9. The producing process set forth in claim 8, wherein the ceramic particles, the ceramic fibers and the ceramic whiskers comprise an oxide capable of forming a film through a reaction with the binder material.

10. The producing process set forth in claim 9, wherein said magnesium forms a film of a spinel phase on the surface of said at least one preform-forming material through a reaction with said at least one preform-forming material, said film comprising a compound having a spinel structure.

11. The producing process set forth in claim 10, wherein the impregnation is effected under pressure.

12. The producing process set forth in claim 10, wherein the impregnation is effected with no pressurization.

13. The producing process set forth in claim 9, wherein said ceramic particles, ceramic fibers and ceramic whiskers comprise aluminum borate.

14. The producing process set forth in claim 13, wherein the impregnation is effected under pressure.

15. The producing process set forth in claim 13, wherein the impregnation is effected with no pressurization.

16. The producing process set forth in claim 9, wherein the impregnation is effected under pressure.

17. The producing process set forth in claim 9, wherein the impregnation is effected with no pressurization.

18. The producing process set forth in claim 8, wherein said magnesium forms a film of a spinel phase on the surface of said at least one preform-forming material through a reaction with said at least one preform-forming material, said film comprising a compound having a spinel structure.

19. The producing process set forth in claim 18, wherein said ceramic particles, ceramic fibers and ceramic whiskers comprise aluminum borate.

20. The producing process set forth in claim 18, wherein the impregnation is effected under pressure.

21. The producing process set forth in claim 18, wherein the impregnation is effected with no pressurization.

22. The producing process set forth in claim 8, wherein said ceramic particles, ceramic fibers and ceramic whiskers comprise aluminum borate.

23. The producing process set forth in claim 22, wherein the impregnation is effected under pressure.

24. The producing process set forth in claim 22, wherein the impregnation is effected with no pressurization.

25. The producing process set forth in claim 8, wherein the impregnation is effected under pressure.

26. The producing process set forth in claim 8, wherein the impregnation is effected with no pressurization.

* * * * *

UNITED STATES PATENT AND TRADEMARK OFFICE
CERTIFICATE OF CORRECTION

PATENT NO. : 6,521,061 B1  Page 1 of 1
DATED : February 18, 2003
INVENTOR(S) : Hideharu Fukunaga et al.

It is certified that error appears in the above-identified patent and that said Letters Patent is hereby corrected as shown below:

<u>Column 8,</u>
Line 38, please change "of" to -- or --.

Signed and Sealed this

Sixteenth Day of September, 2003

JAMES E. ROGAN
*Director of the United States Patent and Trademark Office*